United States Patent [19]

Schaible et al.

[11] Patent Number: 4,715,175
[45] Date of Patent: Dec. 29, 1987

[54] BINDER-TWINE GUIDE AND CUTTER MECHANISM FOR ROLL-BALER

[75] Inventors: Siegfried Schaible, Singen/Htwl.; Hans-Peter Wölfle; Eike Güsewell, both of Gottmadingen; Bernhard Kohl, Winkelhaid, all of Fed. Rep. of Germany

[73] Assignee: Klockner-Humboldt-Deutz AG Zweigniederlassung Fahr, Gottmadingen, Fed. Rep. of Germany

[21] Appl. No.: 808,348

[22] Filed: Dec. 11, 1985

[30] Foreign Application Priority Data

Dec. 11, 1984 [DE] Fed. Rep. of Germany ....... 3445060

[51] Int. Cl.⁴ .............................................. A01D 39/00
[52] U.S. Cl. ........................................ 56/432; 53/135; 100/3; 100/9
[58] Field of Search ...................... 56/343, 432; 100/1, 100/2, 3, 8, 9; 53/135, 588

[56] References Cited

U.S. PATENT DOCUMENTS

| | | | |
|---|---|---|---|
| 1,017,202 | 2/1912 | Bryan | 100/9 |
| 3,179,453 | 4/1965 | Walters | 100/1 |
| 3,611,916 | 10/1971 | Valan | 53/135 |
| 4,043,363 | 8/1977 | Tange | 53/135 |

FOREIGN PATENT DOCUMENTS 3414080 10/1985 Fed. Rep. of Germany .

Primary Examiner—Stephen J. Novosad
Assistant Examiner—William P. Neuder
Attorney, Agent, or Firm—Karl F. Ross; Herbert Dubno

[57] ABSTRACT

A binding apparatus for tying up a round bale of harvested material formed in a baler, which is mounted on the housing of the baler, comprises at least one cord supply spool, a cord guide mechanism for guiding at least one cord along the upper surface of the round bale to tie the bale up, and a cutting mechanism for the cord, which is connected to the cord guide mechanism. The cord guide mechanism comprises at least one cord guide arm and a cord disk having a gear unit. The cutting mechanism is connected by means of a connecting rod to one end of a pulling strap, the other end of the pulling strap being attached by means of a pulling spring to a transverse truss provided for the binding apparatus, and on the cord guide mechanism an operating mechanism cooperating with the pulling strap is provided, in order to tie up the bale once or twice according to choice, before the cord is cut by the cutting mechanism.

7 Claims, 6 Drawing Figures

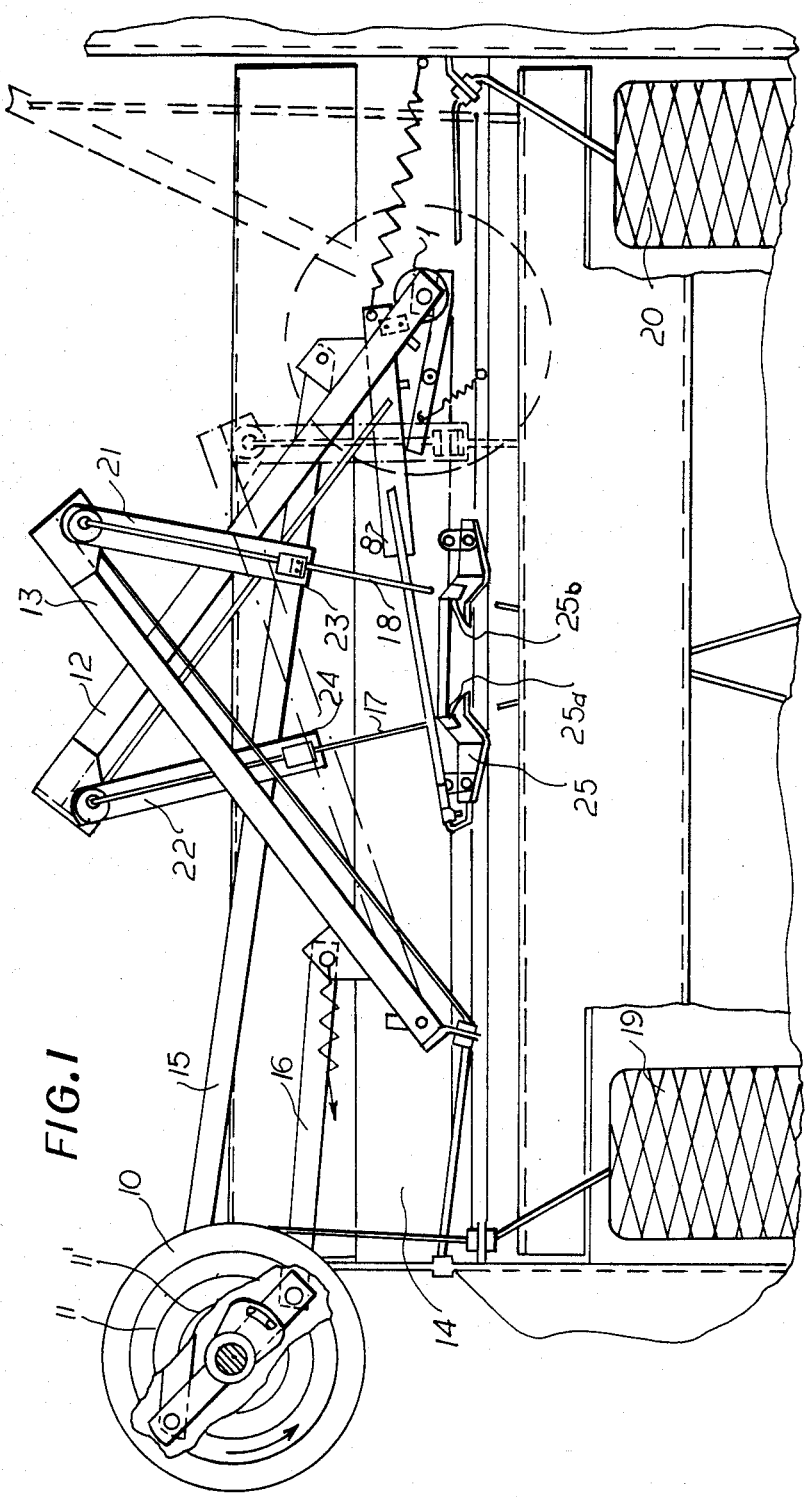

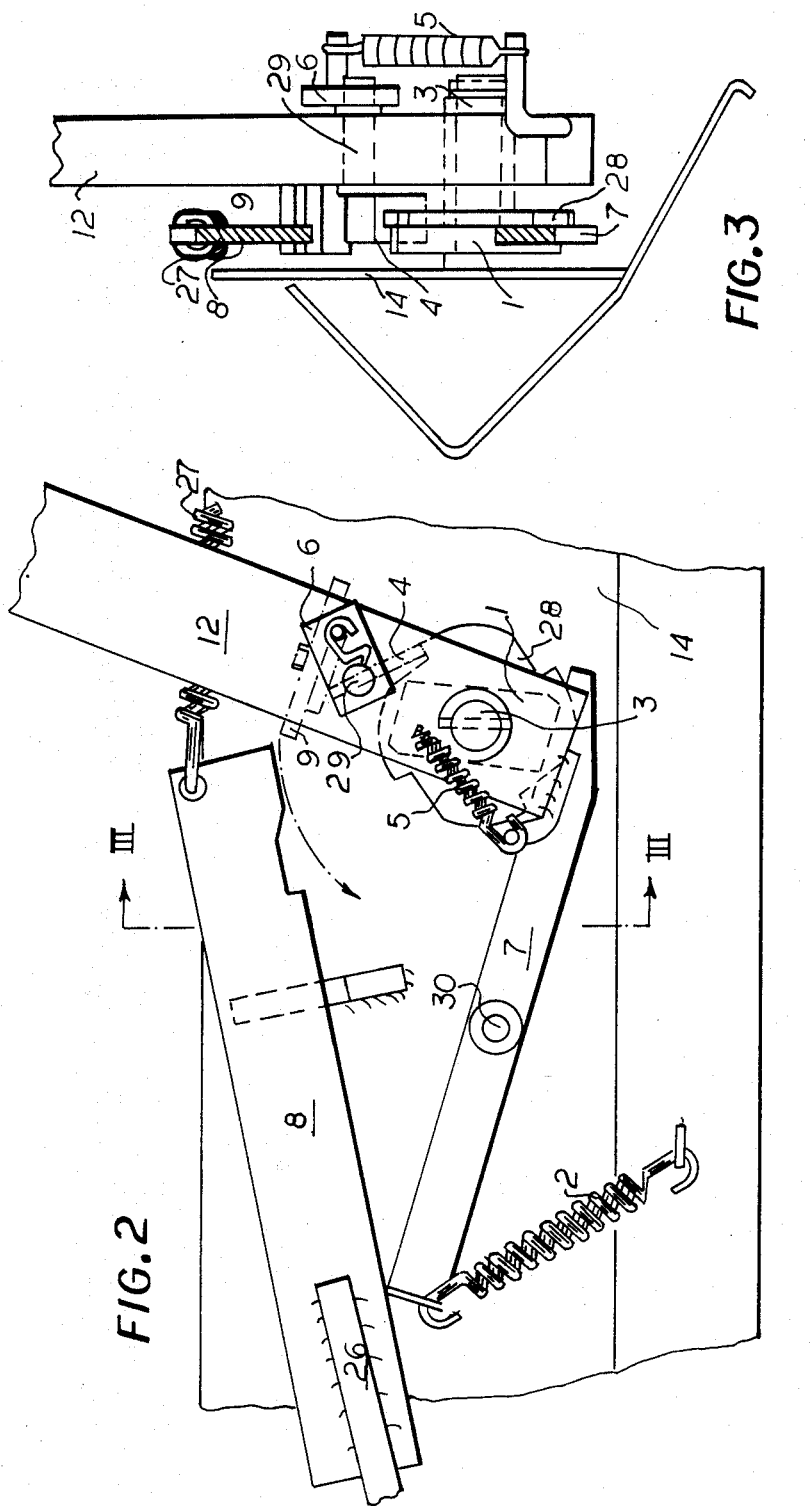
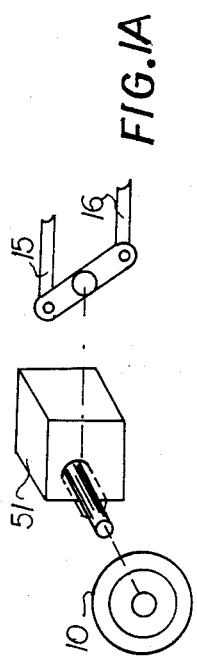
FIG.3
FIG.1A
FIG.2

BINDER-TWINE GUIDE AND CUTTER MECHANISM FOR ROLL-BALER

FIELD OF THE INVENTION

Our present invention relates to a binder-twine guide and cutter mechanism for a large rolled-bale baler for haulm and other agricultural or crop material and, more particularly, to a binder for tying up or binding a round bale formed in a baler or roll-baling press from stems, stalks and like cuttings grass, cultivated plants and the like harvested materials.

BACKGROUND OF THE INVENTION

German open application DE-OS No. 34 14 080 (corresponding to the commonly owned U.S. Pat. No. 4,557,189 issued Dec. 10, 1985) describes a mechanism for binding a round bale of agricultural material, such as stems and the like cuttings from grass, cultivated plants, and the like, which is mounted on the housing of a baler or baling press.

This mechanism comprises at least one cord or twine supply spool, a cord guide mechanism for conducting the cord strands along the upper surface of the bale to be tied and a cutting mechanism for the cord.

The cutting mechanism is attached to the cord guide mechanism, and the cord guide mechanism comprises at least one cord guide arm and a cord-driven disk having a gear unit.

Large balers or baling presses, with which a round (cylindrical) bale of up to several cubic meters size can be produced are of growing interest. Such balers usually have a rolling chamber, on whose periphery a plurality of rollers driven in the same direction are provided, which form the harvested material, for example, hay, straw, or corn stalks, into a cylindrical bale which is held by cord or twine suitable binding or tying apparatus positioned at the end of the rollers, whereafter the bale is pushed out through the rear door of the baler. The apparatus has a cord guide mechanism comprising two pivotable cord guide arms positioned in separate planes with clearance from each other, whereby both cord guide arms are pivotably mounted on a transverse truss or traverse provided parallel to the entrance gap. Both cord guide arms are pivotable by connecting bars in opposite directions, and of course from an initial position, in which they cross each other and which is suitable for tying up the bale by binding cord about its center, to a maximum position, which is suitable for simultaneously tying up both ends of the bale, and to a final position, which essentially corresponds to the initial position. Both cord guide arms are drivable by the cord itself by means of the cord disk and the gear unit.

The binder mechanism is further provided with an automatic cutting mechanism, which is slidable by one of the cord guide arms from a rest position into an operating position and reciprocates, so that at the end of the tying process, that is, after a fresh crossover of each cord strand by the cord guide arms, a scission of both cords occurs, whereafter the binder mechanism remains idle until the formation of a fresh bale in the baler.

This known binding apparatus has the advantage that the binding cords cross over each other many times on the bale upper surface, so that the cord strands can be wound tightly with high tension around the bale.

OBJECTS OF THE INVENTION

It is an object of our invention to provide an improved binding apparatus for tying up or binding a round bale of agricultural material, particularly grass, cultivated plants, and the like, formed in a baler or bale making press.

It is another object of our invention to provide an improved binding apparatus for tying up or binding a round bale of harvested material formed in a baler, wherein the round bale is tied up faster and better than in those of the prior art and with greater versatility.

It is yet another object of our invention to provide an improved binding apparatus for tying up or binding a round bale of harvested material formed in a baler, wherein the bale is provided with a netlike jacket, so that no damage can occur to the round bale during transport, while utilizing a minimum amount of cord in a controlled way.

SUMMARY OF THE INVENTION

These objects and others which will become more apparent hereinafter are attained in accordance with our invention in a binding apparatus or mechanism for tying up a round bale of agricultural material formed in a baler, which is mounted on the housing of the baler, the binding apparatus comprising at least one cord supply spool, a cord guide mechanism for guiding at least one cord or twine strand along the upper surface of the round bales to tie the bales up, and a cutting mechanism for the cord, this cutting mechanism being attached to the cord guide mechanism. The cord guide mechanism further comprises at least one cord guide arm and a cord disk having a gear unit.

According to our invention the cutting mechanism is connected to one end of a pulling strap or link by a connecting rod, the other end of the pulling strap being attached by means of a pulling or tension spring to a transverse truss provided for the binding apparatus, and on the cord guide mechanism an operating mechanism is provided, in order to tie up the bale selectively once or twice, that is, less than three times, as desired, before the cord is cut by the cutting mechanism.

The two-turn binding cycle performed by the cord guide mechanism is particularly advantageous with short and dry harvested materials. The individual cord strands applied by the fast two-turn tying process of the bale form a netlike jacket around the bale, so that no haulm, grass cuttings, stems or the like can be lost, even when the bale is handled excessively.

On the lower end of the cord guide mechanism one of the cord guide arms is supported pivotally on a guide arm pivot pin, and a ratchet control device is positioned coaxial to the guide arm pivot pin of that cord guide arm. By a mechanical linkage and at least one pawl spring the pulling strap is shiftable between a raised position in which the cutting apparatus is not slidable into the cutting position, and a lowered position in which the cutting mechanism is slidable into the cutting position.

Advantageously the ratchet control device has a ratchet wheel, on which a twin control cam is mounted rigidly, wherein a ratchet lever is mounted pivotally on the same side of the cord guide arm as the ratchet wheel, positioned so as to be able to engage the ratchet wheel, and wherein the ratchet lever is also acted upon at least indirectly by a pawl spring.

Coaxial to the ratchet lever pivot pin for the ratchet lever a pawl is pivotally attached. Adjacent and under the pulling strap a two armed pivoting lever or double arm lever is positioned on a wall of the housing of the binding apparatus mounted rotatably preferably at its center.

A first end of the double arm lever cooperates with the twin control cam, and the second end of the twin arm lever cooperates with the pulling strap. The pawl is attached to a first end of a pawl spring whose second end is attached to the first end of the double arm lever.

The cord guide arm has a catch which is positioned to act on the pulling strap when in the lowered position.

It is particularly advantageous, when a plurality of grooves for the cord, running parallel to each other of differing diameters are provided on the periphery of the cord disk.

Advantageously the cord guide mechanism has two cord guide arms for delivering two cords, which are each pivotally connected by a connecting rod to the cord disk, so that the cord guide arms move in opposite directions.

By definition the operating mechanism comprises a ratchet control device, a pawl spring, a double arm lever, and a lever spring. The ratchet control device by definition comprises a twin control cam, a ratchet wheel, a ratchet lever, and a ratchet lever pivot pin.

The multigroove cord disk of the invention has the advantage, that the cord usage is not doubled when the cord is passed around the bale a second time in the binding process, and the binding time is not doubled on the second pass.

In another preferred embodiment of our invention the cord guide mechanism together with the operating mechanism belonging to it can be slidably mounted parallel to the upper surface of the round bale.

BRIEF DESCRIPTION OF THE DRAWING

The above and other objects, features, and advantages of our invention will become more readily apparent from the following description, reference being made to the accompanying highly diagrammatic drawing in which:

FIG. 1 is a rear view of a baler having a preferred embodiment of a binding apparatus according to our invention attached thereto and appearing as it would after a bale has been bound;

FIG. 1A is a diagram showing how the drive disk of the mechanism is coupled to the crank of the twin guide arms;

FIG. 2 is an enlarged plan view of the operating mechanism for the cutting mechanism and associated components in the binding apparatus of FIG. 1;

FIG. 3 is a side cross sectional view of the operating mechanism of FIG. 2 taken along the line III—III of FIG. 2;

SPECIFIC DESCRIPTION

Figure 4:
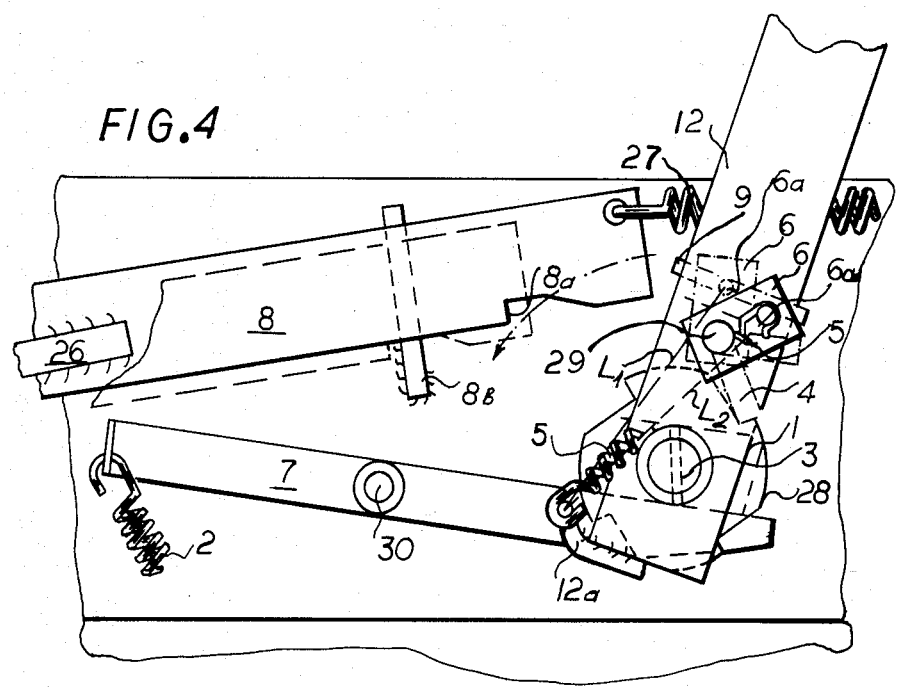
FIGS. 4 and 5 are two further enlarged action views of the operating mechanism for the cutting mechanism shown in FIG. 2 in the cutting position.

A binding apparatus for wrapping a large round bale with cord is shown in FIG. 1, which for example is positioned at the rear end of the pressing chamber of an unshown round bale press or baler, which can be likened to the one described in the aforementioned publication.

When a round bale in the round bale press has almost attained its final size, the operation of the binding apparatus is triggered by a releasing mechanism not shown in detail and is ready for operation. When this release occurs both cord guide arms 12 and 13, which cross each other at the end of the binding process as well as at the beginning of the binding process, fall by the force of gravity to a lowered position, as is indicated in FIG. 1 by the position of the cord guide arm 13 which is shown in dotted lines.

Because of the connection between both cord guide arms 12 and 13 the second cord guide arm 12 also moves in a similar way to a lowered position, whereby the free cord ends 17 and 18 hanging down arive in the entry gap between the round bale and press roller and are taken up.

The cord guide arms 12 and 13 are attached at their lower ends pivotally on a transverse truss 14, which extends parallel to the press roller and is connected rigidly with the housing of the baler. Each cord guide arm 12 or 13 is connected with a connecting bar 15 or 16 to a gear unit 51, which can be a planetary gear unit or a ratchet gear unit (FIG. 1A). The gear unit 51, which can have a reduction of 1/50 to 1/60 is connected with a cord disk 10, which has along its outer periphery several grooves 11 and 11', which are positioned side-by-side thereon.

The connecting bars 15 and 16 can be pivotally connected to a crank gear, which is connected with one of the rollers, which again are connected by a rocker arm and an eccentric with the cord disk 10, which is driven by the binders twine or cords 17 and 18 unwinding during a binding operation.

The cords 17 and 18 are delivered from the cord supply spools 19 and 20, wherein the cord 18 winds around the cord disk 10 at least once, then runs along the cord supply arm 12 until it is at its other end not attached to transverse truss or traverse 14, on which is provided an extension 21 mounted pivotally thereon, with a cord control 23 positioned at its lower end. The second cord strand 17 is delivered from a cord supply spool 20, is run along on the second cord guide arm 13 and on the extension 22 attached pivotally to it, on which a similar cord control 24 is provided.

The cord guide arms 12 and 13 are pivotable in opposite directions, whereby the guide arm pivot joints mounted on the transverse truss are staggered with respect to the longitudinal axis of transverse truss 14 in such a way, that the cord supply arms 12 and 13 themselves cannot touch during opposing swings.

After a round bale is made in the press chamber of the baler, the binding apparatus is released, whereby the cord guide arm 12 because of the force of gravity moves a bit to a lowered position. Because of the connection of the cord guide arm 12 by its connecting bars 15 with the gear unit 51 and the cord disk 10 the second cord guide arm 13, which crosses over the cord guide arm 12 in its initial position, is similarly moved to a lowered position, so that the free ends of the cords 17 and 18 hanging down from the extensions 21 and 22 reach into the entrance gap, and are taken up by the rotating pressing roller and the round bale. The cord disk 10 begins now to rotate with suitable speed and drives the gear unit 51. Because of the reduction by the gear unit 51 both cord guide arms 12 and 13 move slower than required by the unwinding of both binding cords 17 and 18, and of course in an opposite direction from the original crossed over starting position to a maximum position, which corresponds to the binding of the outer ends of the round bale and subsequently to a final position, which corresponds approximately to the initial position and which is shown in FIG. 1.

The wrapping or tying up of the round bale begins in its center and, since each cord guide arm 12 or 13 describes approximately a quarter circle, and of course in both directions, is considerably quicker than usual and attains a more uniform and tight tying up or binding than has been attained in the prior art. Shortly before the end of the tying up process a further crossing over of the cord occurs in the center. Both at the beginning of the process and also at the end the cords are guaranteed to cross over each other.

After ending of the binding or tying process a cutting mechanism 25 is automatically advanced, which is armed with two cutting knives 25a, 25b not shown in detail in order to cut the binding or typing cord 17 and 18, whereafter the binding or typing apparatus stands idle.

The cutting mechanism 25 is positioned slidably on the transverse truss 14 and can be pushed by one of the cord guide arms 12 or 13 from its resting position until in its cutting position, in which both cords 17 and 18 are cut through.

Both cord guide arms 12 and 13 guide both cords 17 and 18 into the recess in the cutting mechanism 25, in which both cords 17 and 18 lying against the knives are cut through.

Should a particularly short and dry pressed material be worked up to a round bale and tied up, it can be required that, instead of a single tying cycle with subsequent automatic cutting of the cord strands, a second tying or pass around the bale is performed before the cord strands 17 and 18 can be cut through in order to provide a net-like jacket for the bale. For the cutting through of the cord 17 or 18 the cutting mechanism 25 is connected by a connecting rod 26 and a pulling strap 8 attached to connecting rod 26 to a pulling spring 27 (See FIGS. 2 to 5), which is mounted on the housing of the baler, or the transverse truss 14. The pulling spring 27 moreover tends or acts to pull the cutting mechanism 25 into its out of engagement position.

The operating mechanism for the cutting mechanism comprises a ratchet control device and a twin control cam 1, which is connected rigidly to the ratchet control device. The ratchet control device has additionally a ratchet wheel 28, which is rigidly connected with the twin control cam 1, and is mounted on the guide arm pivot pin 3 for the cord guide arm 12 and is operable by it. On the same side as the ratchet wheel 28 a ratchet lever 4 is positioned rotatably on a ratchet pivot pin 29, while on the opposing side of the cord guide arm 12 a pawl 6 is connected pivotally on the same ratchet lever pivot pin 29. The pawl 6 is attached to one first end of and acted on by a pawl spring 5, whose other second end is attached to a first end of a twin arm lever 7, which is mounted near its center rotatably by a twin arm pivot pin 30 on the housing wall 14. The other second end of the twin arm lever 7 is acted upon by a lever spring 2, which is similarly attached to the housing wall 14 at its other end.

The twin arm lever 7 engages with first end under the lower end of the ratchet control device and engages with its other second end under the pulling strap 8 for the connecting rod 26 of the cutting mechanism 25.

The twin control cam 1 connected rigidly with the ratchet control device presses the second end of the twin arm lever 7 to a lowered position, so that the pulling strap 8 and the cutting machanism 25 are lifted. Because of that, a catch 9 positioned on the cord supply arm 12 can move itself under the pulling strap 8 for the cutting mechanism 25 without the cutting mechanism 25 sliding into its cutting position. In the next cycle of the cord guide arm 12 the twin control cam 1 in the ratchet control device is positioned so that the twin arm lever 7 cannot raise the pulling strap 8, so that the catch 9 positioned on the cord guide arm 12 can slide the pulling strap far enough, that the cutting mechanism 25 arrives in its cutting position shown in FIG. 1. After the cutting of both cords the cord guide mechanism stands idle or remains still. The finished round bale is thus tied in this way twice.

The stressing of the ratchet lever can be so adjusted, that in pushing of the pawl spring 5 beyond the dead point of the spring (by the operator), the pawl 6 remains otu of engagement. In this switched out position the cord is cut away after each swing cycle of the cord supply arms 12 and 13. Accordingly each finished round bale is tied only once.

In a new operating position of the cord guide mechanism the cord guide arms 12 and 13 fall freely to a lowered position. Thereby the catch 9 on the cord guide arm 12 acts on the twin arm lever 7, whereby the pulling strap 8 for the cutting mechanism is raised, released and pulled back.

As can best be seen from FIG. 4, the twine-guide arm 12 is freely rotatable on the journal pin 3. On the twine-guide arm 12, a switchover pawl 6 is pivotable about a further journal pin 29.

The upper end of a tension spring 5 is hooked to a pin 6a of this pawl. The lower end of this spring 5 is hooked in an eye 12a welded to the bottom of the arm 12.

From FIG. 4 it can also be seen that the pawl 6 can assume two positions relative to the arm 12.

In one of these position shown in dot-dash lines, the spring 5 holds the pawl to one side of a deadcenter position defined by the pivot axis of pin 29 beause the line of action $L_1$ of the spring is to the left (FIG. 4) of the pivot axis of the pivot 29. When the pawl 6 is in this position, there is no connection between the pawl finger 4, heretofore referred to as the ratchet lever, and the ratchet wheel 28. Consequently, there is no interaction between the ratchet wheel 28 and the double-arm lever 7.

The twine-guide arm 12 is only pivotable about the axis of pin 3 under the control of the coupling rod or bar 15 (see FIG. 1). FIG. 4 also shows the position of the twine-guide arm 12 when it has reached its outermost pivotal position (compare the broken-line position shown in FIG. 1). During the binding process, the twine-guide arm 12 is swung counterclockwise by the coupling bar or rod 15 toward the middle of the machine (compare FIGS. 4 and 5). During this swinging movement, the arm 11 carries the entrainer 9 in the counterclockwise sense, this entrainer engaging the end of the pulling strip 8. The entrainer is thereby moved into the broken-line position shown in FIG. 4.

Figure 5:
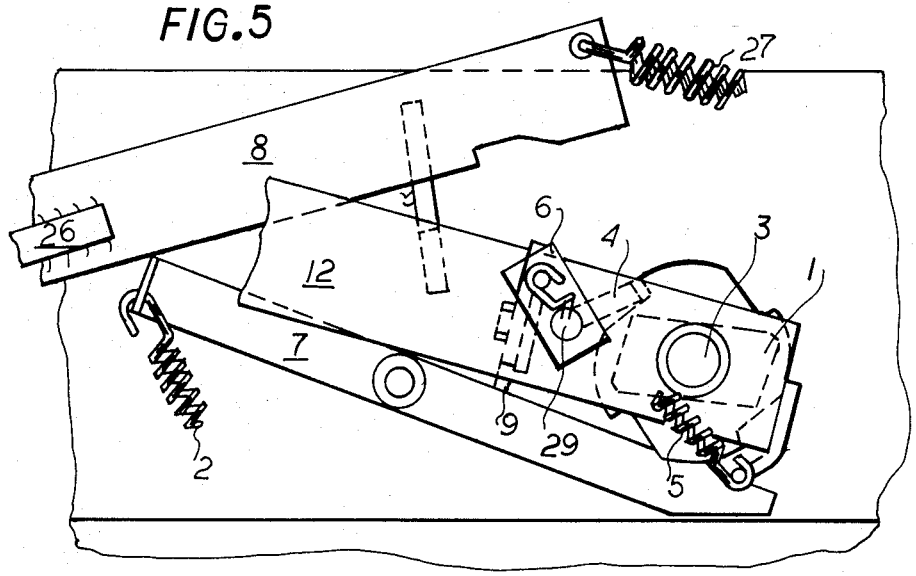

With further pivotal movement of the arm 12 in the counterclockwise sense, the strap 8 is moved to the left sufficiently to enable its notch 8a to engage a plate 8b so that the strap 8 is retained against movement to the left while it is cleared by the entrainer 9 as the latter moves toward the position seen in FIG. 5.

The strip 8 is thus retained in this broken-line position seen in FIG. 4, being held there by the tension spring 27.

As soon as the strap 8 has reached its terminal position shown in broken lines in FIG. 4, the cutting device 25, controlled by the cutting rod 26 (FIGS. 2 and 4) has reached its forward end position.

As noted, the binder-twine-guide arm 12 continues its movement in the counterclockwise sense until it reaches the position shown in FIG. 5.

The twine end 17, coming from the right, is sung so far to the left that it engages in the opening between the cutting blades 25a and 25b (FIG. 1) so that the twine can be cut against the blade 25a at the end of this pivotal movement.

The position of the twine-guide arm 12 in which the twine is cut by the blade 25a corresponds to the end position at the end of a binding operation.

The twine-guide arms 12 and 13 are returned to their starting positions at the beginning of a binder operation as follows:

When the cylindrical bale has been completely rolled up, a binding operation is triggered as, for example, is described in U.S. Pat. No. 4,557,189 mentiond previously. The triggering of the binding operation is significant only in that the twine-guide arms 12 and 13 form under their respective weights downwardly into their lowermost positions shown in broken lines in FIG. 1 for the arm 13.

This drop of the twine-guide arms 12 and 13 has the effect, following a cutting operation, of feeding the free remaining twine end, i.e. the twine end which has been cut loose from the previous bale, and clamped between the twine brakes 23 and 24, into the pressing chamber of the baling press so that it can lie upon the next bale which is formed therein.

The twine is drawn into the chamber and the twine-guide arms 12 and 13 are guided automatically by the twine length. For a single twine pass, the twine-guide arms 12 and 13 are swung out of their central crossing position outwardly into their respective end positions and thereafter swung back to their center positions for cutting of the two twine lengths 17 and 18.

For the two-pass binding, the switching pawl 6 is swung in the clockwise direction about its pivot 29 so that it is held in the position shown in solid lines in FIG. 4 because the spring 5 acts along the line of action $L_2$ i.e. to the right-hand side of the axis of the pivot 29.

In this position the double-control cam 1 has a generally vertical orientation. The right-hand arm of the double-arm lever 7 rests against the underside of the cam 1 so that the spacing of this lever from the pivot 3 is large. This means, concomitantly, that the left-hand end of the double-arm lever 7 has been swung in the clockwise sense sufficiently that the strap 8 has been lifted from the plate 8b and has been drawn out of engagement with the latter by the spring 27. Thus the entrainer 9 cannot come into contact with the strap 8 and shift the latter to the left by contrast with the arrangement shown in FIG. 4.

The movement of the arm 12 to the left, therefore, cannot initiate a cutting arrangement 25. This means that the twine-guide arm 12, during the first binding pass can swing toward the middle without cutting the twine at the end of the first binding pass.

When the twine-guide arm 12 swings outwardly, the finger 4 of the pawl slides over the curved back of the tooth of the ratchet wheel 28.

When the twine-guide arm 12 reaches its middle position again, therefore, the finger 4 drops into a position ahead of a tooth of the ratchet wheel. Thus (see FIG. 5) when the lever 12 is swung in the clockwise sense outwardly, the ratchet wheel 28 is rotated in its clockwise sense. This has the effect of rotating the double cam 1 so that it is brought into a generally horizontal position which can be seen from FIG. 4.

In this position the double-arm lever 7 is brought closer to the pivot 3 and no longer impedes the engagement between the entrainer 9 and the strap 8 whe the lever 12 is again swung to the left. In the second pass, therefore, upon its completion, the twine is cut. The return movement along the back of the cam switches over the pawl 6 so that line of action $L_1$ of the spring 5 becomes effective.

In order that the cord usage and binding time not be doubled, When cord is tied around the round bale twice, additional grooves 11 smaller in diameter are formed on the cord disk 10, which is simultaneously the drive disk 10 for the cam gear.

Instead of the pivotally supported cord guide arm it is also possible, to employ a cord supply mechanism itself movable linearly parallel to the round bale axis, which likewise is optionally suitable for single or doubly tying. In this case to cut out the ratchet control mechanism the guide of the linearly movable ratchet lever is pushed so that it comes out of engagement.

We claim:

1. In a binding apparatus for tying up a round bale of agricultural harvested material formed in a baler, said binding apparatus being mounted on the housing of said baler, said binding apparatus comprising at least one cord supply spool, a cord guide mechanism for guiding at least one cord along the upper surface of said round bale to tie said bale up, and a cutting mechanism for said cord, said cutting mechanism being attached to said cord guide mechanism, wherein said cord guide mechanism comprises at least one cord guide arm and a cord disk having a gear unit, the improvement wherein said cutting mechanism is connected by a connecting rod to one end of a pulling strap, the other end of said pulling strap being attached by a pulling spring to a transverse truss provided for said binding apparatus, and on said cord guide mechanism an operating mechanism cooperating with said pulling strap is provided, in order to tie up said bale selectively once or twice before said cord is cut by said cutting mechanism.

2. The improvement according to claim 1 wherein on the lower end of said cord guide mechanism one of said cord guide arms is supported pivotally on a guide arm pivot pin, and a ratchet control device is positioned coaxial to said guide arm pivot pin of said one of said cord guide arms, so that by mechanical linkage and a pawl spring said pulling strap is shiftable between a raised position, in which said cutting mechanism can not be slid into a cutting position, and a lowered position, in which said cutting mechanism can be slid into said cutting position.

3. The improvement according to claim 2 wherein said ratchet control device comprises a ratchet wheel, on which a twin control cam is fixed rigidly and on said one of said cord guide arms a ratchet lever is mounted on the same side of said one of said cord guide arms as said ratchet wheel pivotally on a ratchet lever pivot pin above said ratchet wheel, said ratchet lever being positioned so as to be able to engage said ratchet wheel.

4. The improvement according to claim 3 wherein coaxial to said ratchet lever pivot pin on the other side of said cord guide arms a pawl is pivotally mounted which is attached to a first end of and acted on by said pawl spring, whose second other end is connected with a twin arm lever under said ratchet control device, said twin arm lever being pivotally connected to said housing, the first end of said twin arm lever cooperating with said twin control cam and the second other end of said twin arm lever cooperating with said pulling strap.

5. The improvement according to claim 4 wherein said one of said cord guide arms has a catch which cooperates with said pulling strap to push said pulling strap, so that said cutting mechanism arrives in a cutting position, when said pulling strap is in said lowered position.

6. The improvement according to claim 5 wherein on the periphery of said cord disk a plurality of grooves running parallel to each other having different diameters are provided for said cord.

7. The improvement according to claim 6 wherein said guide mechanism has two of said cord guide arms for delivering two of said cords for tying said bale and each of said cord guide arms is pivotally connected by a connecting bar to said cord disk, so that said cord guide arms move in opposite directions to each other.

* * * * *